United States Patent [19]

Kambeitz

[11] Patent Number: 5,057,056
[45] Date of Patent: Oct. 15, 1991

[54] CONCAVE GUIDE FOR A COMBINE HARVESTER

[76] Inventor: Ben Kambeitz, Box 93, Richmound, Saskatchewan, Canada, S0N 2E0

[21] Appl. No.: 617,162

[22] Filed: Nov. 23, 1990

[51] Int. Cl.⁵ .......................................... A01F 12/00
[52] U.S. Cl. ................................................ 460/110
[58] Field of Search ............... 460/71, 110, 111, 108, 460/32; 56/14.6

[56] References Cited

U.S. PATENT DOCUMENTS

| | | | |
|---|---|---|---|
| 923,324 | 6/1909 | Brost | 460/110 |
| 1,643,683 | 9/1927 | Shorb | 460/110 |
| 2,303,200 | 11/1942 | Dray | 460/110 X |
| 3,034,513 | 5/1962 | Ausherman | 460/110 X |
| 3,256,887 | 6/1966 | Ausherman | 460/110 X |
| 3,512,533 | 5/1970 | Loewen | 460/110 X |
| 4,004,404 | 1/1977 | Rowland-Hill et al. | 460/110 X |
| 4,909,772 | 3/1990 | Kuchar | 460/110 X |

Primary Examiner—Thuy M. Bui
Attorney, Agent, or Firm—Adrian D. Battison; Stanley G. Ade; Murray E. Thrift

[57] ABSTRACT

A threshing concave or concave guide for a combine harvester is described. The concave is positioned in its conventional location on a combine, however, the design has been modified. The crop is directed into the concave by threshing cylinder rasp bars. As the crop enters the guide, at its base, there are positioned a number of angled bars that direct the incoming crop away from the center of the concave. Traditional concaves move the grain toward the center of the device. The angled bars of the present invention distribute the load more evenly along the concave surface, thereby resulting in a decreased wear and tear of the concave and rasp bars. The design also reduces the damage to separate grain as the grain slides into the leading edge of the device rather than abruptly hitting the sharp edge of a first cross bar, as in traditional concaves.

4 Claims, 2 Drawing Sheets

CONCAVE GUIDE FOR A COMBINE HARVESTER

FIELD OF THE INVENTION

This invention relates to the field of threshing concaves for use in a combine harvester.

BACKGROUND OF THE INVENTION

Combine harvesters are well known farm machines that have been used for many years. An integral part of the device is the threshing concave or concave guide, that separates and guides the crop as it is carried by the cylinder. The grain is rubbed and beaten thereon by the cylinder to separate the grain from the straw stalks. The grain then passes from the concave into a cleaning mechanism in which the chaff is separated and discarded.

The normal course of the incoming straw, as a result of the action of the auger and straw conveyor, is to move the straw to the centre of the concave and overload the centre of the concave as well as the centre of the feeder house, the sieve and straw walker. The overloading of the centre causes the rasp bars of the threshing cylinder to wear out more quickly near the centre. The disproportion of load also causes a plugging of the sieve and walker components as well thus reducing the capacity of the combine.

Some attention has been given in the prior art to modifications to the design of the concave for various purposes. For example:

U.S. Pat. No. 1,643,683 describes a concave with grooves thereon, rather than ribs, arranged to converge as the straw is moved rearwardly so that the straw is turned as it moves over the concave.

U.S. Pat. No. 923,324 describes a device with a number of fingers that extend outwardly from the rear of the concave, after the grain emerges from the concave. It is stated that this is to move the material outwardly so that it is more evenly spread over the grate and straw rack.

SUMMARY OF THE INVENTION

It is one object of the present invention to provide an improved concave for the cylinder of a combine which improves the processing of the crop. According to the invention therefore there is provided a concave for a cylinder of a combine harvester, said concave comprising means for attaching to a combine harvester, means for cooperation with a threshing cylinder, said concave comprising a part cylindrical body having a first front end and a second rear end and arranged to wrap around the cylinder such that the surface of the cylinder moves from the first front end towards the second rear end, said first end positioned to receive grain from the said threshing cylinder, said concave having a plurality of transversely extending threshing bars, and a plurality of angled guide bars fastened atop the threshing bars adjacent the first end, each of said angled guide bars having a front end and a rear end with said front end positioned closer to a centre line than the rear end so as to tend to move an incoming crop away from the centre of the concave toward the sides of the concave.

The concave therefore tends to spread incoming straw more evenly along the width of the concave, thereby decreasing the disproportion of load that occurs in normal concave devices. The alteration in design also results in a decreased wear and tear on the concave bars as well as a decreased plugging of the sieve and walker components of the combine as the load spreads more evenly across the width of the combine. The design provides for better cleaning as the load spreads out evenly across the separating area. The spreading of the load also extends the life of the rasp bars on the cylinder, as the load moves to the sides as entering the concave, thereby decreasing the load on the middle of the rasp bar.

There is also a reduction in damage to the separated grain because the grain slides into the leading edge of the concave instead of abruptly hitting the sharp edge of the first cross bar. It has also been found that a decreased speed of the cylinder is permitted as the load is more evenly spread.

As mentioned, the grain entering the concave does not abruptly meet the leading cross bar as with a regular concave, but rather it spreads left and right from the centre, thereby moving a load to the underused outer areas. The first cross bars are arranged in a "V" like manner from the middle of the concave so that the grain entering the concave slides to the sides, thereby distributing the load more evenly.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
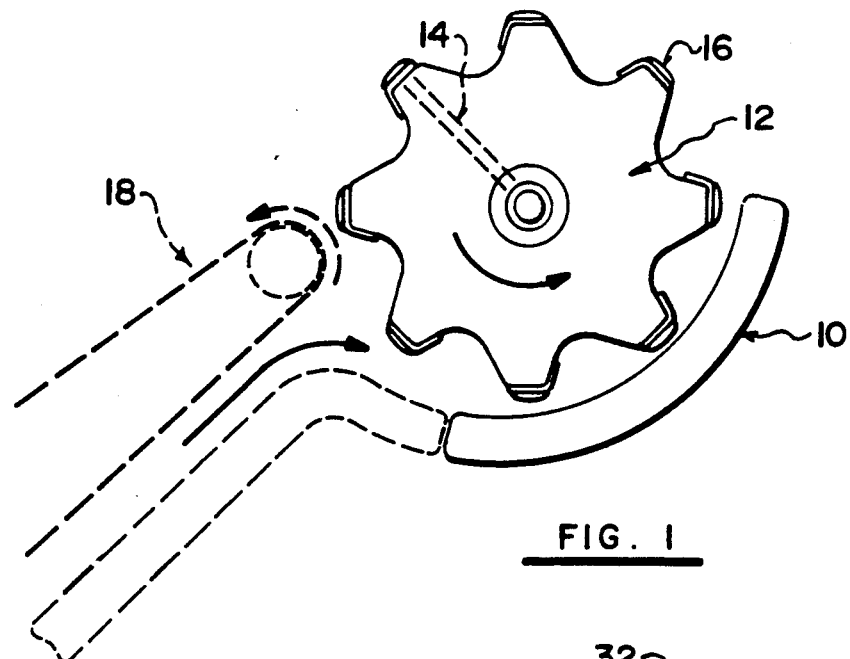
FIG. 1 is a side view of the preferred embodiment in relation to a rotating threshing cylinder of a combine.
Figure 3:
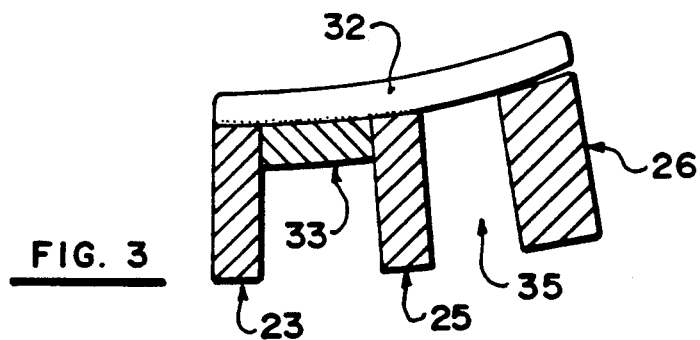
FIG. 3 is a cross sectional view along 3—3.
Figure 4:
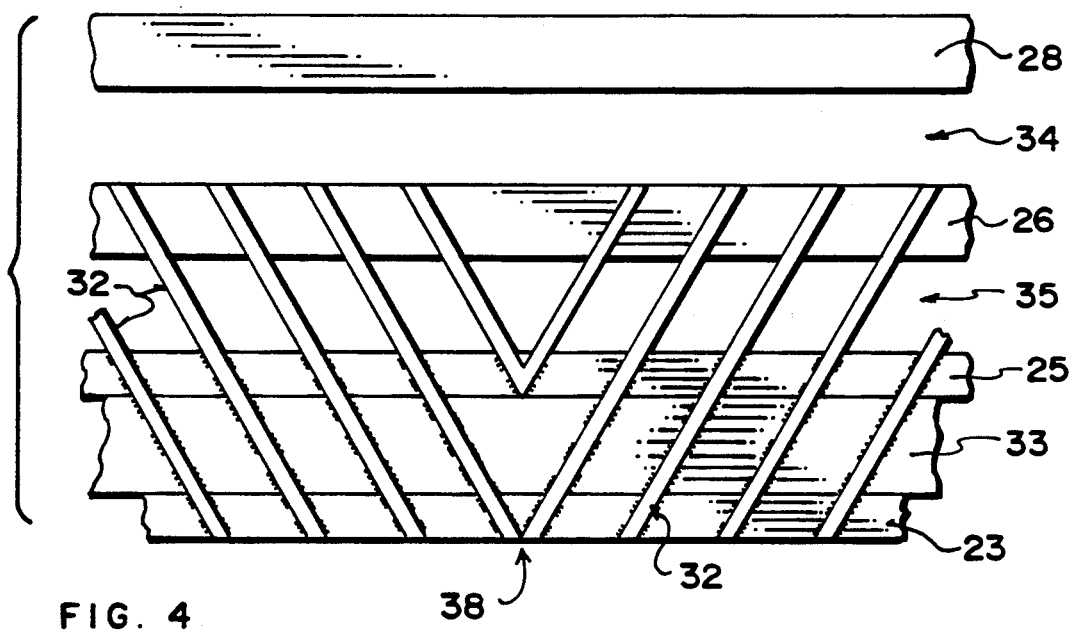
FIG. 4 is an enlarged view of the angled bars and their relationship with the device.
Figure 2:
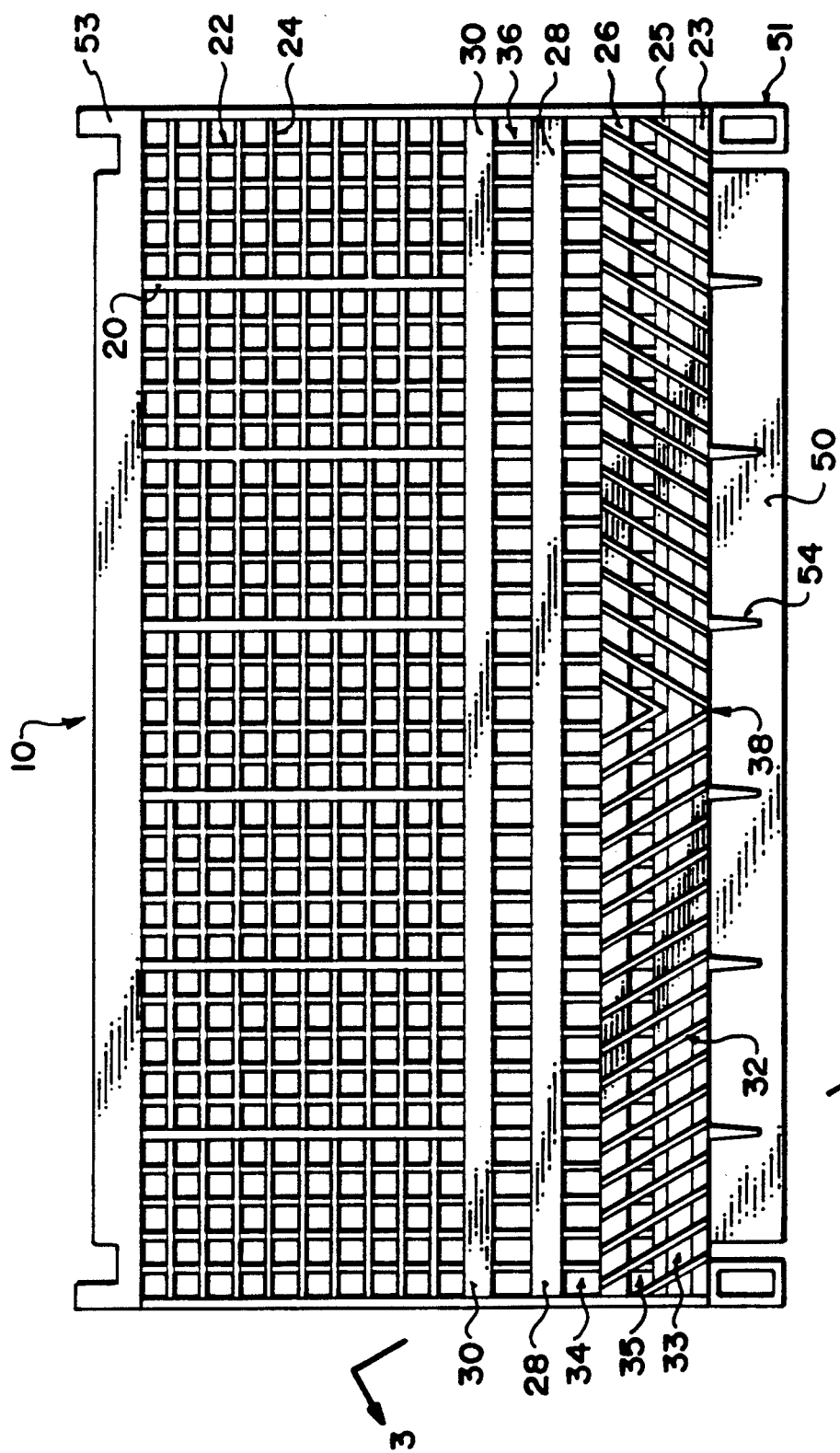
FIG. 2 is a front view of the preferred embodiment.

A stationary concave 10 is in cooperating relation with a rotating threshing cylinder 12. The threshing cylinder 12 is comprised of a plurality of transversely spaced apart flanges 14 keyed on a transversely extending shaft, rotatably mounted on the main chassis of a combine. The flanges support a plurality of rasp bars 16 of equivalent length to the width of the straw elevator or feeder housing.

The concave 10 is comprised of fore and aft extending arcuate main bars 20 and a plurality of transversely extending threshing bars 24. A plurality of arcuate wires 22 extends at regular intervals in the fore and aft direction to the apertures in the bars, thus defining a mesh on the concave for separation of grain therethrough.

The concave 10 extends generally 100° from below its lower end of the threshing cylinder 12 in the vicinity of the discharge of the straw elevator to a location generally at the rearward most portion of the threshing cylinder 12 and generally at the level of the shaft.

There are five main transverse bars 23, 25, 26, 28 and 30 at the lower end of the concave 10. The five transverse bars are equally spaced and thereby form four zones. Zone 33 is between bars 23 and 25, zone 35 is between bars 25 and 26, zone 34 is between bars 26 and 28 and zone 36 is between bars 28 and 30 respectively.

The zone 33, between the bars 23 and 25, is filled between the bars so that there is no space between the bars 23 and 25.

There is extending from the base of concave 10 a plurality of angled guide bars 32 atop bars 23, 25 and 26 and attached to the top of the main transverse bar 26. The angled guide bars 32 are positioned at an angle parallel to each other and forming an equal distance between them. The angled guide bars are parallel and aligned in a direction towards the closer side of the concave. The centre angled guide bars meet to form a "V" 38 at the centre of the concave at its base. The angled guide bars align with the arcuate main bars 20 and the vertical wires 22 that run the length of the concave. The angled bars 32 are essentially continuous with bars 23 and 25, however they are raised approximately ¼" from the horizontal bars 26, 28 and 30. The means for attachment of the concave to the combine at the cylinder is entirely conventional and comprises a front flange 50, side brackets 51, a rear flange 52 and side bracket 53. The front flange is reinforced by webs 54. The bars 26, 28 and 30 are beveled towards the base of the concave. This creates a wedge effect and aids in the outward distribution of the grain as it enters the concave. This will be discussed below.

As the crop enters the lower end of the concave from the straw elevator 18 through the cylinder 12, the crop moves head first into the concave thresher where it slides over the first zone 33 then approaches and enters the second zone 35 between the bars 25 and 26. At this point the grain is dislodged from the heads and is directed backwardly and outwardly to the third cross bar 28. As the crop moves along, the grain falls through the second zone 34, between the bars 25 and 25, and through the concave mesh.

The angled guide bars 32 at the lower end of the concave 10 direct the incoming grain and slide the grain into the horizontal bars 26, 28 and 30 rather than causing an abrupt collision with the horizontal bars that occurs in most traditional concaves. The sliding action of the grain as it enters the concave, away from the centre of the concave 38, decreases the load on the centre of the concave and redistributes it to the underused sides of the concave. The direction of the grain also results in a decreased wear and tear of the centre of the concave as well as the centre of the rasp bars. The angled bars are raised above the concave mesh approximately ¼" above the cross bars 26, 28 and 30. They are relatively continuous with the bars 23 and 25.

In conventional combines, the harvested product is moved towards the centre of the straw tray and concave. The structure of the angled rods 32, on the embodiment herein described, spreads the grain from the middle across the width of the concave, effectively using the whole structure and not just the centre portion. The concave structure herein not only reduces wear and tear of the concave, but also prevents the clogging of the sieve and walker components of the combine harvester. It also allows the thresher cylinder to run at a decreased RPM as a result of the load redistribution. This decrease in RPM keeps the straw on the concave for a longer period of time and thus the grain is easier to separate from the straw in the straw walkers and sieve regions. In the combine described, the normal RPM would be 900 RPM but with the above described concave structure, the speed has been slowed to 600 RPM. A decreased RPM, along with the sliding action of the grain, results in minimal cracked grain, along with less wear and tear.

Since various modifications can be made in my invention as hereinabove described, and many apparently widely different embodiments of same made within the spirit and scope, it is intended that all matter contained in the accompanying specification shall be interpreted as illustrative only and not in a limiting sense.

I claim:

1. A concave for a cylinder of a combine harvester, said concave comprising means for attaching to a combine harvester, means for cooperation with a threshing cylinder, said concave comprising a part cylindrical body having a first front end and a second rear end and arranged to wrap around the cylinder such that the surface of the cylinder moves from the first front end towards the second rear end, said first end positioned to receive grain from the said threshing cylinder, said concave having a plurality of transversely extending threshing bars, and a plurality of angled guide bars fastened atop the threshing bars adjacent the first end, each of said angled guide bars having a front end and a rear end with said front end positioned closer to a centre line than the rear end so as to tend to move an incoming crop away from the centre of the concave toward the sides of the concave.

2. A concave as described in claim 1, said concave having five main transverse bars therein at its first end, said transverse bars forming four zones therebetween, said first zone between the first and second bar being filled therebetwen, said angled bar thereby continous with the filled zone; said transverse bars having integrally attached thereto said angled guide bars, said angled guide bars extending from the first end of the concave to the third major transverse bar.

3. A concave as described in claims 1 or 2 in which the angled bars each have an upper surface thereof projecting just above an upper surface of the third, fourth and fifth transverse bars.

4. A concave as described in claim 3 in which the third, fourth and fifth transverse bars are beveled towards the first end of concave.

* * * * *